INVENTOR
Homer G. Boyle
BY
Wood, Herron & Evans
ATTORNEYS

June 4, 1968  H. G. BOYLE  3,386,694
POSITIONING MOUNT FOR ANTENNAS AND THE LIKE
Filed Aug. 22, 1966  4 Sheets-Sheet 2

INVENTOR
Homer G. Boyle
BY
Wood, Herron & Evans
ATTORNEYS

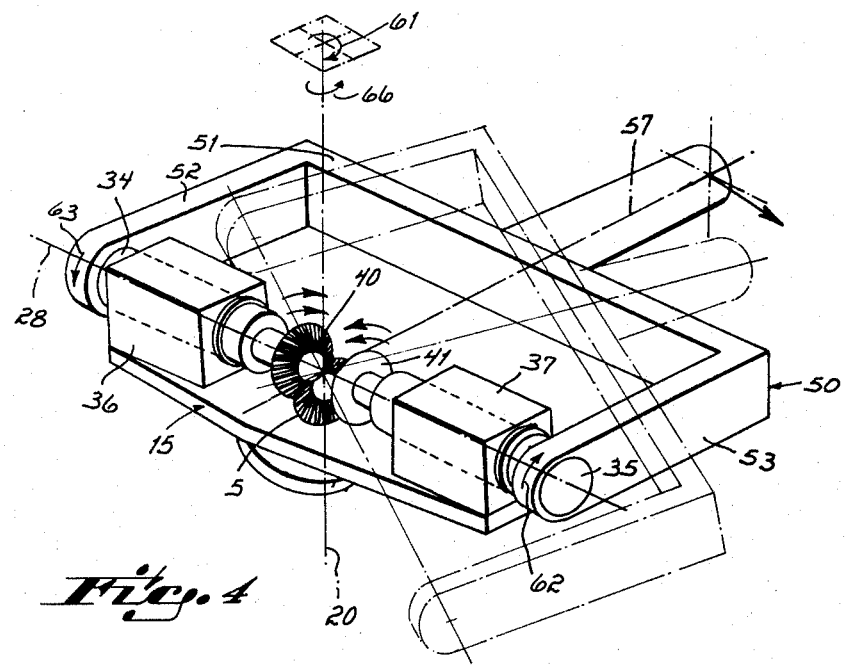

June 4, 1968     H. G. BOYLE     3,386,694
POSITIONING MOUNT FOR ANTENNAS AND THE LIKE
Filed Aug. 22, 1966     4 Sheets-Sheet 4

INVENTOR
Homer G. Boyle
BY
Wood, Herron & Evans
ATTORNEYS

United States Patent Office 3,386,694
Patented June 4, 1968

3,386,694
POSITIONING MOUNT FOR ANTENNAS
AND THE LIKE
Homer G. Boyle, Yonkers, N.Y., assignor to Aeronca,
Inc., Middletown, Ohio, a corporation of Ohio
Filed Aug. 22, 1966, Ser. No. 574,239
7 Claims. (Cl. 248—179)

ABSTRACT OF THE DISCLOSURE

A mount is disclosed for imparting azimuthal, elevational or combined azimuthal and elevational motion to an antenna or the like. The mount includes a stationary reaction gear about which is rotatably mounted an azimuthal yoke having a pair of upstanding arms which rotatably support a pair of oppositely disposed bevel gears in meshing engagement with the reaction gear, and an azimuthal yoke having a pair of arms stationarily mounting the stators of motors whose shafts drive the bevel gears. In operation, when the motors are driven at the same rate and in the same direction, pure azimuthal motion is imparted to an antenna mounted on the elevational yoke. Elevational antenna motion is produced by driving the motors in opposite directions and at the same speed. Combined elevational and azimuthal antenna motion is produced by driving the motors at different speeds.

---

This invention relates to support and driving apparatus and is more particularly directed to a two axis positioning mount capable of universal motion for positioning a device, such as a radar antenna, in both azimuth and elevation in response to suitable command signals.

While the positioning mount of this invention is useful with a variety of devices such as gun mounts, searchlights, radio telescopes, and infrared detectors, it will be described with respect to a specific application in which it finds particular utility, namely, in conjunction with a large, ground-based radar tracking installation. The typical tracking station includes a large, dish-shaped antenna. The antenna frequently measures sixty feet or more in diameter and, consequently, often weighs many thousands of pounds. The tracking station also includes a mount for supporting and positioning the antenna. The mount generally is capable of imparting both azimuthal and elevational positioning motion to the antenna in response to suitable command signals.

In the past, a number of problems have arisen with regard to the design of the antenna positioning mounts required in these tracking installations. For example, in many prior art positioning mounts the design of the mount is such that the antenna must be mounted at a substantial distance from one or more of the various axes of motion. Mounting arrangements of this type generally involve large moments of inertia, making rapid acceleration and deceleration possible only by resort to extremely large motors and heavy duty drive assemblies. This inertia problem is particularly troublesome in present-day installations where extremely large, and consequently massive, antennas weighing many tons are used.

Another problem associated with the prior art mounts, which also is attributable to the remote positioning of the antenna with respect to one or more of the axes of motion, is the inaccuracies and errors introduced by deflections of the mount structure. As those skilled in the art will appreciate, the further the antenna is from the axes of motion the greater the length of the structural members needed to couple the antenna to the drive means. And, the greater the length of these structural members, the more likely it is that deflections will occur and introduce errors into the tracking motion. Such deflections are aggravated in many of the present-day installations by the very large antennas that are used. This is due to the tendency of large antennas to increase the amount of deflection because of their greater mass. In addition, greater deflections result with large antennas as a consequence of the larger forces which the antennas are subjected to due to wind and accumulations of ice.

A further problem, which accompanies large physical separations between the antenna and the axes of motion often present in prior art mounts, resides in the difficulty encountered in counterbalancing the antenna. The further the antenna is from the mount center of mass, the more delicate the counterbalancing problem is and the harder it is to achieve a condition of dynamic balance.

It has been, therefore, a principal object of this invention to provide an antenna positioning mount in which the antenna is mounted closely adjacent the axes of motion. This objective is achieved in this invention by a novel differential gear arrangement which permits the antenna to be mounted at or near the intersection of the axes of motion. Specifically, this novel arrangement includes two coaxially and horizontally disposed motors, each of which have their stators rotatably mounted and fixed to an antenna support, and their rotors meshing through bevel gears with a stationary reaction gear. This arrangement effectively couples a pair of drive motors to an antenna support member in such a manner that applied torque about the elevational axis is mechanically converted to torque about the azimuth and elevation axes, the distribution of the torques being a function of the direction and magnitude of the torques applied by the two drives. In operation, depending on the direction and relative speed of the two motors, the motor stators traverse around the stationary reaction gear and/or revolve about their own axes of revolutions, thus creating elevational, azimuthal, or combined elevational-azimuthal motion.

Specifically, with the motors driven at the same rate and in the same direction, equal and opposite torques are applied by the stators to the antenna support, preventing production of an elevational motion component. The motor torques, consequently, are reflected through the shafts to the bevel gears where they are reacted by the stationary gear, producing pure azimuthal motion. Reversed pure azimuth speed is produced by reversing both motors simultaneously and driving them at the same rate and in the same rotational directions.

Elevational motion occurs when the motors are driven in opposite directions and at the same speed. Under these conditions, torques equal in magnitude and direction are reflected to the bevel gears and reacted by the stationary gear to the antenna support, producing elevational motion. Reversal of direction of elevational motion is produced by reversing both motors and driving them at the same rate and in the direction.

Combined elevational and azimuthal motion is produced when the motors are driven at different speeds. Under these conditions unequal torques are produced which, when reacted by the stationary gear, produce both azimuthal and elevational motion components.

An advantage of this mounting arrangement which permits the antenna to be mounted directly on or very closely adjacent the axes, is that a compact structure results which is low in inertia, which resists structural deflection, and which is easily counterbalanced and dynamically stabilized.

Another and independent advantage afforded by the positioning mount of this invention is that as the antenna motion approaches pure azimuth or pure elevation, increased power is available to permit higher accelerations with a given total available power. This characteristic of operation is attributable to the fact that as pure azimuth or elevation is approached, the motors cooperate in such a manner that the output of both motors simultaneously becomes available to drive the antenna in either pure azimuth or pure elevation.

Another objective of this invention has been to provide an antenna positioning mount in which, in addition to the antenna, auxiliary equipment, such as hydraulic pumps, valves, wave guides, R-F horns, and cabling may be mounted closely adjacent the axes of motion. This promotes better symmetry and balance, as well as reduced inertia. Such a result is achieved with the structure of this invention by providing a yoke having its arms fixed to the motor stators and its central portion mounting the antenna. The yoke frees the space between the opposed bevel gears, making it available to receive auxiliary equipment necessary for the operation of the tracking system.

An added advantage of the above yoke arrangement, should the R-F horn be located in the space between the bevel gears, is that the horn can be mounted at the point of intersection of the axes of motion. With the horn so mounted, only one universal motion joint is required to mount the horn for tracking movement with the antenna as contrasted with at least two such joints required if the horn is not so mounted.

Another objective of this invention, also of primary importance, has been to provide a positioning mount which can produce both azimuthal and elevational motion notwithstanding the failure of one of its drive motors. This objective is achieved by providing selectively operable azimuth and elevation brakes which positively prevent azimuthal and elevational motion, respectively, permitting the torque produced by the operative motor to be reacted by the stationary gear for producing solely elevational and azimuthal torques, respectively.

The several features of the invention will become more readily apparent from the following description taken in conjunction with the accompanying drawings in which like numerals designate like elements, FIGURE 1 is an elevational view in cross-section of the preferred embodiment of this invention, taken along line 1—1 of FIGURE 2;

FIGURES 4–7 are simplified diagrammatic views of the preferred embodiment, in perspective, showing the relationship of the drive and reaction torque directions to the components of the preferred embodiment, which are encountered under various operational conditions.

Figure 1:
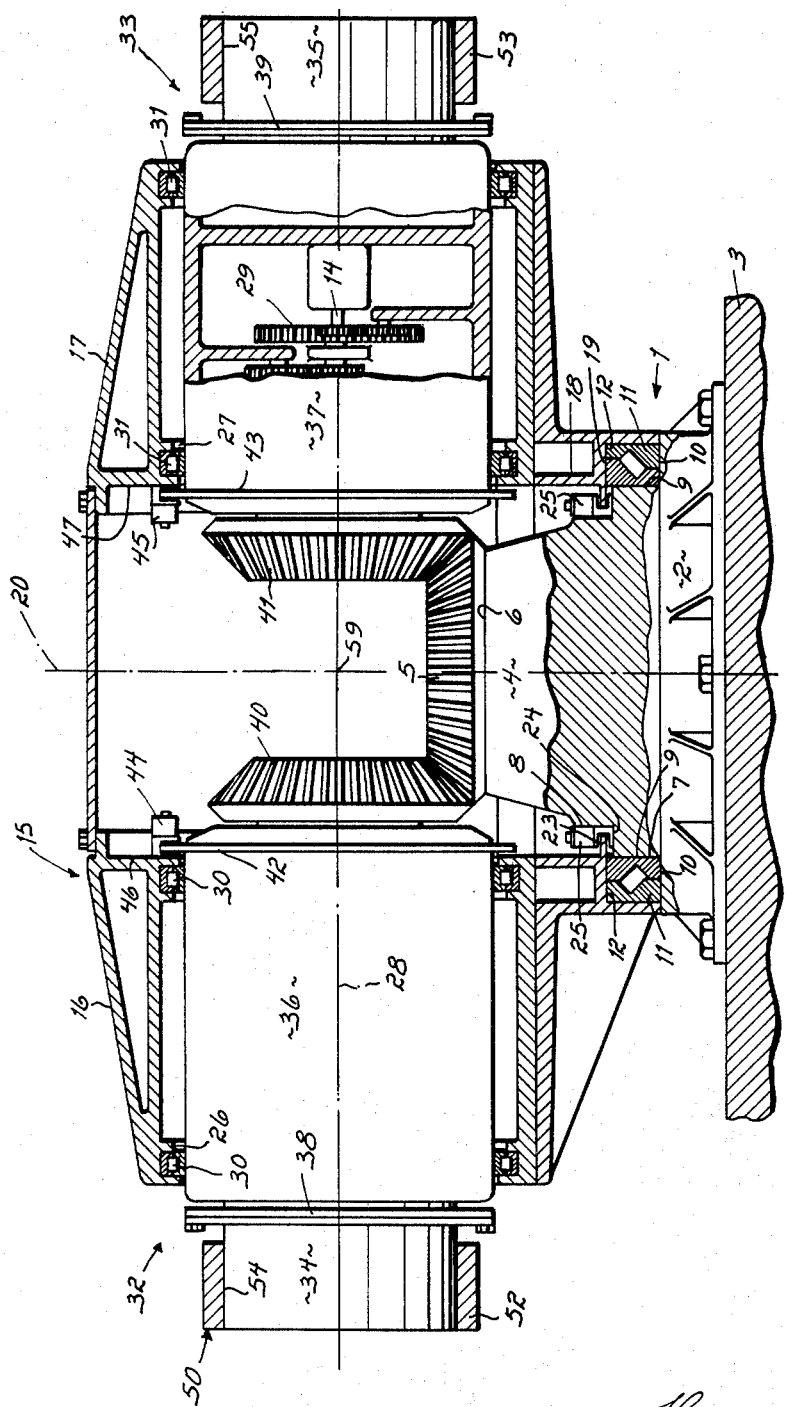
Figures 2, 3:
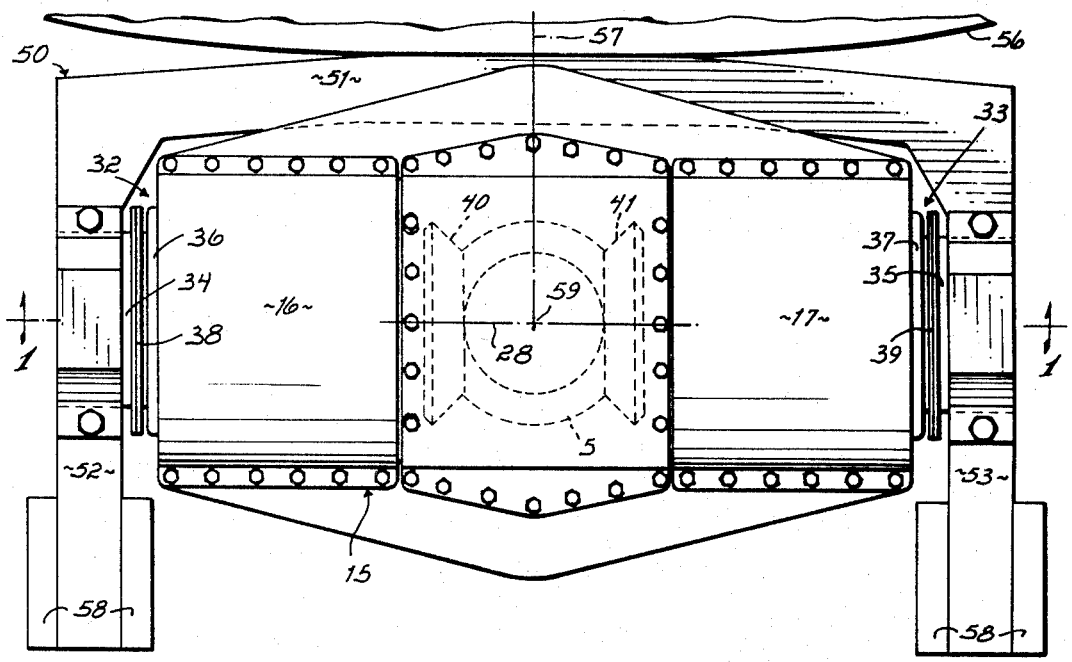
FIGURE 2 is a top view of the preferred embodiment.
FIGURE 3 is a side elevational view of the preferred embodiment.

The antenna positioning mount, as shown in FIGURES 1 and 2, includes an upstanding central support or pedestal 1 having a generally frusto-conical shape. The pedestal 1 has a bottom or base section 2 for securing or mounting the pedestal 1 to the ground or some other suitable support surface 3. A top section 4 of the pedestal 1 supports a stationary bevel gear 5 which is co-axially mounted to the uppermost surface 6 of the pedestal 1. The pedestal 1, intermediate the base section 2 and the top section 4, is formed into lower and upper stepped diameter sections 7 and 8. Snugly embracing the vertical surface 9 of the lower stepped diameter section 7 of the pedestal 1 and supported by the horizontally extending surface 10 of the base section 2 is an azimuth bearing 11, the function of which will be described later.

The antenna positioning mount also includes a movable support or azimuth yoke generally indicated by the numeral 15. The azimuth yoke 15 has a pair of parallel vertical arms 16 and 17, which are joined at their lower extremities to a centrally located and vertically disposed tubular leg 18. The tubular leg 18 is mounted co-axial with, and circumscribes at its lower end, the gear 5 and the pedestal 1. A horizontally extending internal flange 19 is formed on the internal surface of the leg 18 and seats on the outer portion 12 of the upper surface of the bearing 11 thereby supporting the yoke 15 for rotation about the vertical or azimuthal axis 20 common to the pedestal 1, gear 5, and yoke 15. The inner edge 23 of the flange 19 is parallel to and slightly overlaps the annular horizontal surface 24 of the lower stepped diameter pedestal section 7. Cooperating with the flange edge 23 and fixed to the periphery of the upper stepped diameter section 8 are azimuth brakes 25. The azimuth brakes 25 are selectively engageable with the flange edge 23 for the purpose of controlling and arresting the rotational motion of the azimuth yoke 15 about its vertical axis 20.

Two oppositely disposed bores 26 and 27 having a common horizontal or elevation axis which intersects the azimuth axis 20 are formed in the vertical legs 16 and 17, respectively, of the azimuth yoke 15. Positioned within the bores 26 and 27 are drive means 32 and 33 which are supported for rotation about the elevation axis by pairs of ring-shaped elevation bearings 30 and 31. The drive means includes bi-directional variable speed motors 34 and 35 the housings of which are secured at their inboard ends to the outboard ends of a pair of gear box housings 36 and 37, respectively, by suitable flange mounts 38 and 39, respectively. The gear box housings 36 and 37 rotate within the elevation bearings 30 and 31, respectively. The shafts 14 of the motors 34 and 35, only one of which is shown, are co-axial with the elevation axis 28. The shafts 14 of motors 34 and 35 are connected through suitable gearing 29, which is encased within the gear box housings 36 and 37, to co-axial oppositely disposed bevel gears 40 and 41, respectively, which mesh with the stationary bevel gear 5.

To control or arrest the rotational motion of the gear box housings 36 and 37 and their associated motors 34 and 35, flanges 42 and 43 are formed on the inboard ends of the gear box housings. The flanges 42 and 43 are adapted to be selectively engaged by elevation brakes 44 and 45, respectively, which are secured to the inner surfaces 46 and 47 of the yoke legs 16 and 17, respectively, thereby controlling the motion of the motors 34, 35 and gear boxes 36, 37 relative to the azimuthal yoke arms 16, 17.

The antenna positioning mount further includes, as shown more particularly in FIGURE 3, an elevation yoke, indicated generally by the numeral 50. The yoke 50 is provided with a pair of parallel arms 52 and 53 having oppositely disposed bores 54 and 55 which are co-axial with the elevation axis 28 and which are adapted to securely embrace the housings of the motors 34 and 35 positioned therein. The elevation yoke arms 52 and 53 are secured at one end to a common cross member 51 to which is fixed an antenna or other suitable device 56 to which it is desired to impart universal motion. In practice, the focal axis 57 of the antenna 56 intersects the elevation axis 28 and azimuthal axis 20 at a common point 59. Secured to the other end of the elevation yoke arms 52 and 53 are counterweights 58 for balancing the elevation yoke 50 and antenna 56 about the elevation axis 28.

The antenna positioning mount is operative to produce azimuthal motion, elevational motion, or combined azimuthal and elevational motion by selectively driving the motors 34 and 35 at the same or different rates of speed and in the same or opposite directions depending on the particular motion desired. Alternatively, elevational motion, azimuthal motion, and combinations of elevational and azimuth motion may be generated by selectively varying the speed and direction of a single one of the motors 34 or 35 while simultaneously restricting the relative motion between either the two yokes 15 and 50 or between the pedestal 1 and the azimuth yoke 15, the motion being restricted by actuating the appropriate brake 25, 44 or 45.

As shown more particularly in FIGURE 4, pure azimuthal motion about the azimuthal axis 20 in the direction of arrow 61 is obtained by driving the oppositely disposed motors 34 and 35 in the same predetermined direction and at the same speed. Under the foregoing operational conditions, the stators of motors 34 and 35 apply drive torques through the shafts 14 and gears 29 enclosed in the housings 36 and 37, respectively, which tend to rotate gears 40 and 41, respectively, about the elevation axis 28 in the direction of the arrows 62 and 63, respectively. As will be understood by those skilled in the art, reaction torques equal in magnitude and oppositely directed relative to the aforementioned drive torques are produced which tend to rotate the stators and housings of the motors 34 and 35 about the elevation axis 28 in the direction of arrows 63 and 62, respectively. The reaction torques applied to the housings of motors 34 and 35 are secured, respectively, to the elevation yoke arms 52 and 53, and tend to rotate the arms 52 and 53 oppositely about the elevation axis 28 in the direction of the arrows 63 and 62, respectively. This tendency of the arms 52 and 53 to rotate in opposite directions is prevented by the common cross member 51 which is secured at its ends to the arms 52 and 53 and which effectively constitutes the elevation yoke 50 of a rigid body. Since the elevation yoke 50 is a rigid body and since the reaction torques applied to the yoke 50 are equal and opposite, the reaction torques cancel producing zero net torque on the yoke 50, and hence no yoke 50 rotation.

While the reaction torques applied to the yoke 50 arms 52 and 53 via the housings of the motors 34 and 35 cancel and are thus unable to produce opposite rotation of the arms 52 and 53, the drive torques acting on the bevel gears 40 and 41 do not cancel and, consequently, are effective to produce yoke 15 rotation. Specifically, the bevel gears 40 and 41 are free to rotate in engagement with the reaction gear 5 about the elevation axis 28, in the direction of arrows 62 and 63, respectively, and in so doing cause the azimuth yoke 15 to rotate about the azimuth axis 20 in the direction of arrow 61, moving the apparatus to the position shown in phantom lines. This azimuthal motion is transmitted to the antenna 56 via the elevation yoke 50 which, as noted previously, remains stationary relative to the azimuth yoke 15.

The speed at which the azimuth yoke 15 rotates about the azimuthal axis 20, as will be understood by those skilled in the art, is a function of both the speeds at which the bevel gears 40 and 41 rotate about the elevation axis 28, which in this instance are assumed to be equal, and the gear tooth ratio between the gears 40 and 41 and the stationary reaction gear 5. Increasing either the gear speed or ratio or both increases the azimuth yoke speed while decreasing either the gear speed or ratio or both, decreases the azimuth yoke speed. It will be understood that the gear tooth ratio is increased when fewer teeth are provided on gears 40 and 41 and more teeth are provided on reaction gear 5.

In a similar manner, pure azimuthal motion of the antenna-positioning mount in a direction opposite to that described immediately above, that is, about the azimuth axis 20 in the direction of arrow 66, is produced by operating the motors 34 and 35 at the same speed, but in directions opposite to that which was utilized in the immediately preceding example when pure azimuthal motion in the direction of arrow 61 was obtained. As before, the speed of rotation of the azimuth yoke 15, and hence, of the antenna 56 is a function of, and varies with, both the speed of rotation of the gears 40 and 41 and the gear ratio between the gears 40 and 41 and the reaction gear 5.

The purely azimuthal motion of the azimuth yoke 15, which is described above, will be lost and a combined azimuthal and elevational motion will result if either the speeds of the gears 40 and 41, assuming they have the same number of teeth, are unequal or the number of teeth on the gears 40 and 41, assuming the gear speeds are equal, is unequal. More specifically, assuming that the gears 40 and 41 are identical, that the speed of motor 35 is in excess of speed of motor 34, and that the motion directions are the same and tend to rotate the gears 40 and 41 in the direction of arrows 62 and 63, the reaction torque applied by the motor 35 to the yoke 50 arm 53 in a direction tending to make the arm 53 rotate in the direction of arrow 62 will exceed the reaction torque applied by the motor 34 to the yoke 50 arm 52 tending to rotate the arm 52 in the direction of arrow 63 by an amount proportional to the motor speed differential. Unlike when the motors 34 and 35 are driven at the same speed and their reaction torques applied to arms 52 and 53, respectively, are equal and opposite, thereby cancelling and producing purely azimuthal motion in the direction of arrow 61 and with a speed proportional to their identical motor speeds, when the motors 34 and 35 are driven at different speeds the reaction torques applied to the arms 52 and 53, respectively, do not cancel, but instead produce in addition to the purely azimuthal motion in the direction of arrow 61 and at a speed proportional to the slower motor 34, a net torque on the yoke 50 in the direction of arrow 62, which is proportional to the motor speed differential. This net torque causes the elevation yoke 50 to rotate about the elevation axis 28 in the direction of arrow 62 and with a speed proportional to the motor speed differential thereby imparting to the antenna 56 an elevational motion component which is vectorially additive to the azimuthal motion component, which as noted previously, is proportional to the speed of the slower motor 34 and in the direction of the arrow 61. Stated differently, when the motors 34 and 35 are driven under the assumed conditions, the drive and reaction torques of each motor to the extent that they are equal, result in the production of an azimuthal component of yoke 15 motion in the direction of arrow 61 which is proportional to the speed of the slower motor 34, and the drive and reaction torques of each motor, to the extent that they are different, produce an elevational component of yoke 50 motion in the direction of arrow 62 which is proportional to the motor speed differential. The motion of the antenna 56, of course, is the vector sum of the azimuthal and elevational components of motion imparted to the yokes 15 and 50, respectively.

Similarly, if the speed of motor 34 in the preceding example is now made to exceed that of motor 35 and the other assumed operating conditions remain unchanged, an elevational component of antenna motion proportional to the speed differential and in the direction of the arrow 63 will be introduced which is vectorially additive to the azimuthal component of motion proportional to the speed of the slower motor 35 and in the direction of arrow 61.

Similarly, if in either of the two immediately preceding examples, the directions only of both the motors 34 and 35 are reversed, the directions of both the elevational and azimuthal components become reversed while their magnitudes remain unchanged.

Elevational motion is obtained by driving the motors 34 and 35 at equal speeds and in opposite direction, as shown in FIGURE 5. With the motors 34 and 35 driven in opposite directions, drive torques will be applied through the gears 29 and the shafts 14 by the stators of the motors 34 and 35 to the gears 40 and 41 in a direction which tends to rotate both the gears 40 and 41 about the elevation axis 28 in the direction of the arrow 70. Also produced by the operation of the motors 34 and 35 in the manner indicated, are reaction torques which are equal to and oppositely directed from the drive torques applied to the gears 40 and 41. These reaction torques are applied to the arms 52 and 53 through the housings of the motors 34 and 35 and tend to rotate the arms 52 and 53 in the direction of the arrow 72. The drive torque which is applied to the gear 41 by the stator of the motor 35 tending to rotate the gear 41 in the direction of the arrow 70 is transmitted to the gear 5 which, because it is stationary, tends to cause the azimuth yoke 15 to rotate about the azimuth axis 20 in the direction of arrow 75. The drive torque which is applied by the stator of the motor 34 to the gear 40 tending to rotate the gear 40 in the direction of the arrow 70 is transmitted by the gear 40 to the stationary gear 5 tending to cause the azimuth yoke 15 to rotate about the azimuth axis 20 in the direction of the arrow 74. Since the drive torques reacted through the gear 5 to the azimuth yoke 15 are of equal magnitude, the motors 34 and 35 being driven at the same speed and oppositely directed, the net torque applied to the azimuth yoke 15 is zero. With a net torque of zero applied to the azimuth yoke 15, the azimuth yoke remains stationary. Since the gear 5 with which the gears 40 and 41 mesh is also stationary, the gears 40 and 41 are unable to rotate about the elevation axis 28.

However, it will be observed that the reaction torques applied to the arms 52 and 53 by the housings of the motors 34 and 35, which are in the direction of the arrow 72, are in the same direction. These reaction torques, therefore, being in the same direction, are effective to rotate the arms 52 and 53 about the elevation axis 28 in the direction of arrows 72. With the arms 52 and 53 rotating in the same direction and at the same speed, the cross member 55 to which the arms 52 and 53 are fixed, is elevated, raising the antenna 56 which is secured to the cross member. Thus, referring to FIGURE 5, the elevation yoke 50 moves, for example, from the position shown in solid lines to the position shown in phantom lines.

The rate of rotation of the elevation yoke 50 about the elevation axis 28 depends, in the manner indicated previously, on both the rate of speed of the motors 34 and 35 as well as the gear tooth ratio between the gear 5 and the gears 40 and 41.

In a similar manner by driving motor 34 and 35 at the same speed but in directions opposite to those described above, the elevation yoke 50 may be rotated in a direction opposite to that described immediately above, that is, from the position shown in FIGURE 5 in phantom lines to the position shown in solid lines, resulting in the lowering of the antenna 56. Specifically, the motors 34 and 35 are driven such that the drive torques supplied by the stators of the motors 34 and 35 to the oppositely disposed gears 40 and 41, respectively, will tend to cause both of the gears 40 and 41 to rotate about the elevation axis 28 in the direction of the arrow 72. As in the immediately preceding example, a net torque of zero is applied by the gears 40 and 41 to the stationary gear 5 and the azimuth yoke 15, causing the azimuth yoke 15 to remain stationary. However, a net torque on the elevation yoke 50 in a direction opposite to that produced in the preceding example, namely, in the direction of arrow 70, is produced by the reaction torques, which tends to rotate the arms 52 and 53 about the elevation axis 28 in the direction of arrow 70 thereby lowering the cross member 51 and antenna 56 fixed thereto.

In the example immediately above, an azimuthal component of rotation may be vectorially added to the purely elevational motion by rotating the motors 34 and 35 in opposite direction, but at different speeds. For example, if the speed of the motor 35 is in excess of that of the motor 34, the drive torque applied to the gear 41 in the direction of the arrow 77 will exceed that applied to the gear 40 in the direction of the arrow 70, resulting in a net torque being applied to the azimuth yoke 15 which is proportional to the speed differential and in a direction tending to rotate the azimuth yoke 15 about the axis 20 in the direction of the arrow 74. To the extent that the motors 34 and 35 are driven at the same speed, an elevation component of yoke 50 motion is also produced tending to lower the antenna 56 in the manner indicated previously. Thus, with the motors 34 and 35 rotating in opposite directions and with the speeds assumed as indicated, azimuthal and elevational motion components are both produced and in the directions of arrows 74 and 72, respectively.

If in the above example, the speed of the motor 34 is made to exceed the speed of the motor 35, the elevation yoke 15 still rotates about the axis 28 in the direction of arrow 72, but the motion of the azimuth yoke 15 reverses, that is, the azimuth yoke rotates about the axis 20 in the direction of the arrow 75. Specifically, the drive torque applied to the gear 40 exceeds that applied to the gear 41, resulting in a net torque being applied to the azimuth yoke 15 which is proportional to the speed differential and in a direction tending to rotate the azimuth yoke 15 about the azimuth axis 20 in the direction of the arrow 75. To the extent that the motors 34 and 35 are driven at the same speed, an elevational motion component is present which is proportional to the lower of the motor speeds and is vectorially additive to the azimuthal component.

If, in the preceding two examples, the direction only of each of the motors is reversed, the direction of both the azimuthal and the elevational components of motion will also be reversed.

Figure 6:
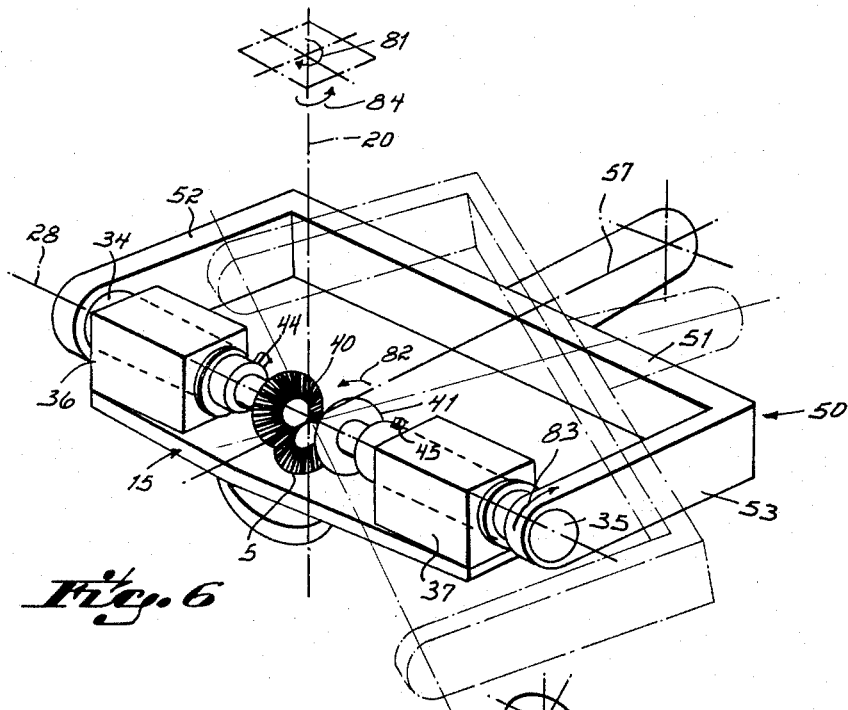

The antenna positioning mount of this invention is also operative to produce azimuthal and elevational motion should one or the other of the motors 34 or 35 become inoperative. For example, referring to FIGURE 6 and assuming that motor 34 is rendered inoperative, azimuthal motion in the direction of arrow 81 is provided by actuating the elevation brake 44 and driving the motor 35 in a manner such that the drive torque applied by the stator of the motor 35 through the gears 29 and shaft 14 to the gear 41 is in the direction of the arrow 82. In addition to the drive torque applied by the stator of the motor 35 to the gear 41 in direction of the arrow 82, a reaction torque oppositely directed and of equal magnitude is applied to the elevation yoke arm 53 through the housing of the motor 35 in a direction tending to rotate the arm 53 about the elevation axis 28 in the direction of the arrow 83. However, with the elevation brake 44 actuated, relative motion between the flange 46 and the brake 44 is prevented, and since the flange 46 is fixed relative to the arm 52 and the brake 44 is fixed relative to the leg 16, elevational motion of the elevation yoke 50 is positively prevented. Since the arm 53 forms part of the yoke 50, arm 53 is also prevented from moving about the elevation axis 28. Thus, the reaction torque applied to the arm 53 is not effective to rotate the arm 53 about the axis 28 in the direction of the arrow 83. Consequently, with the reaction torque applied to the arm 53 ineffective to rotate the elevation yoke about the elevation axis 28, the drive torque applied to the gear 41 in the direction of the arrow 82 rotates the gear 41 in the direction of the arrow 82 producing an azimuthal rotation of the yoke 15 about the azimuthal axis 20, the gear 40 free wheeling at a speed equal to and oppositely directed from the speed of the gear 41. Thus, referring to FIGURE 6, the apparatus moves to the position shown in phantom lines.

If azimuthal rotation of the azimuth yoke 15 is desired in a direction opposite to that produced in the example of the paragraph immediately above, that is, in the direction of the arrow 84, it is only necessary to reverse the direction of rotation of the motor 35. Specifically, the motor 35 is operated such that a torque is applied by the stator of the arm 35 to the gear 41 in the direction of arrow 83.

In a like manner if the motor 35 becomes inoperative, bi-directional azimuthal motion of the azimuth yoke 15 may be produced by locking the elevation brake 45 and driving the motor in the appropriate direction. For example, if azimuthal motion is desired in the direction of the arrow 81 the motor 34 is driven in a direction such that the drive torque applied to the gear 40 by the stator of the motor 34 is in the direction of the arrow 83. If azimuthal motion is desired in the direction of the arrow 84, the motor 34 is driven in a manner such that the drive torque applied to the gear 40 by the motor 34 is in the direction of the arrow 82.

Figure 7:
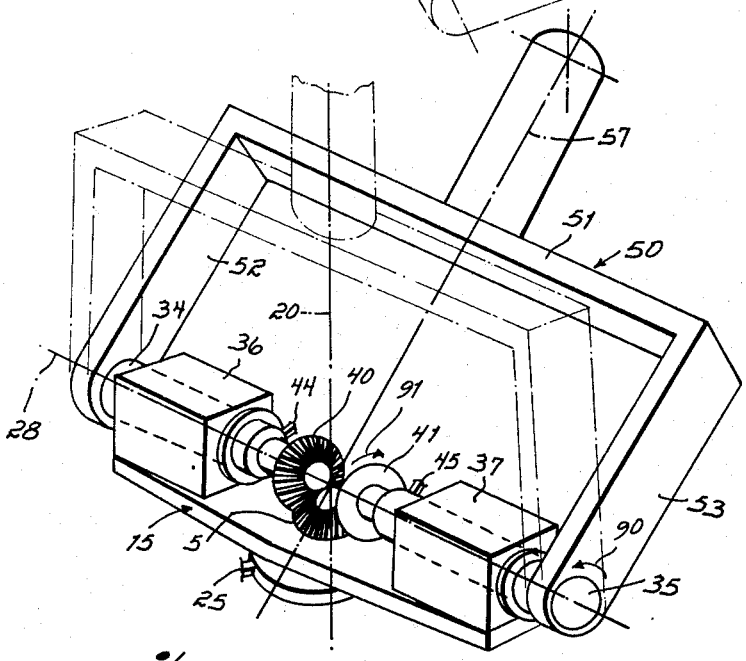

It is also possible should one of the drive motors 34, 35 become disabled to produce elevational motion. Referring to FIGURE 7 and assuming that drive motor 34 becomes disabled, elevational motion is generated by locking the azimuth brakes 25 and driving the motor 35 in one or the other of the two possible directions depending on the direction of elevational motion desired. Specifically, if elevational motion of yoke 50 about the elevation axis 28 in the direction of the arrow 90 is desired, the motor 35 is operated in a direction such that the drive torque applied to the gear 41 by the motor 35 is in the direction of the arrow 91. Driving the motor 35 in this direction produces a reaction torque equal in magnitude and oppositely directed to the drive torque applied to the gear 41 by the stator of the motor 35. This reaction torque is applied to the arm 53 in the direction of the arrow 90 tending to rotate the arm 53 about the elevation axis 28 in the direction of the arrow 90. Since the locking of the azimuth brake 25 prevents relative motion between the yoke 15 and the stationary pedestal 1 and its associated gear 5, the drive torque applied to the gear 41 by the stator of motor 35 is ineffective to rotate the gear 41 about the axis 28. Consequently, the reaction torque rotates the elevation yoke 15 about the axis 28 in the direction of the arrow 90 thereby raising the antenna 50 to the position shown in phantom lines.

If the elevational motion desired is in the direction of the arrow 91, that is, it is desired to lower the antenna 50, the motor 35 is driven such that the drive torque applied to the gear 41 is in the direction of the arrow 90 producing an equal and opposite reaction torque. Here again, since the yoke 15 and the gear 5 are prevented from moving relative to each other, the torque applied to the gear 41 is ineffective to produce rotation of the gear 41 about axis 28, and thus, the reaction torque applied to the arm 53 is effective to rotate the elevation yoke 50 about the axis 28 in the direction of arrow 91 thereby lowering the antenna 50. As the elevation yoke 15 rotates about the axis 28 in either the direction of arrow 90 or in a direction of arrow 91, the gear 40 free wheels in the appropriate direction within the motor 34 thereby not inhibiting the motion of the elevation yoke.

Should the motor 35 become disabled, the elevation yoke may be selectively rotated in either direction about the elevation axis 28 in a manner similar to that described with respect to the operation of the elevation yoke when that the drive torque applied to the gear 40 is in a direction 25 is locked and the motor 34 driven in a manner such that the drive torque applied to the gear 40 is in a direction opposite to that of the desired elevation yoke 15 motion. Again, the non-driven gear, in this case gear 41, will free wheel relative to its motor housing in a direction opposite to the motion of gear 40 as the elevation yoke 15 rotates about the axis 28.

As those skilled in the art will appreciate, in addition to the above-described purely elevational and azimuthal motions possible if one or the other of the motors 34, 35 fails, it is also possible to obtain antenna motion having both azimuthal and elevational components present. Specifically, such combined motion is obtained by partially actuating the appropriate brake 25, 43, 44 thereby permitting slippage between the effected mount components, instead of fully actuating the appropriate brake 25, 43, 44 so as to altogether prevent relative motion between the affected mount components.

Having thus described my invention, I claim:

1. Apparatus for supporting and positioning antennas and the like, said apparatus comprising:
   a base;
   reaction gear means fixed to said base;
   support means mounted for rotation about said reaction gear means;
   first and second gear means in meshing engagement with said reaction gear means;
   first and second motor means fixed relative to each other and rotatably supported by said support means for selectively applying a torque, upon actuation, to said first and second gear means, respectively, thereby imparting universal motion to said motors relative to said base and reaction gear means in response to the simultaneous actuation of both of said first and second motor means; and
   first and second selectively operable brake means for controlling the extent of relative motion between said motor means and said support and between said support and said reaction gear means and base, respectively, thereby enabling universal motion to be imparted to said motor means in response to the combined actuation of one of said motor means and one of said braking means.

2. The apparatus of claim 1 wherein said support means rotates about an axis of said reaction gear means and wherein said first and second gear means are oppositely disposed.

3. The apparatus of claim 2 wherein said motors are maintained in said fixed relation relative to each other by rigid means fixed to said motor means, said rigid means being operative to support a device for universal motion relative to said base and reaction gear means in response to the combined actuation of one of said motor means and one of said brake means.

4. The apparatus of claim 3 wherein said support means is a yoke having spaced arms, said arms providing said rotatable support for said motors.

5. The apparatus of claim 4 wherein said gear means are bevel gears and said first and second bevel gears have a common axis.

6. The apparatus of claim 5 wherein said axes intersect.

7. The apparatus of claim 6 wherein said motor means are bi-directional.

References Cited
UNITED STATES PATENTS

| | | | |
|---|---|---|---|
| 1,689,751 | 10/1928 | Rengler | 74—675 |
| 2,797,374 | 6/1957 | Atton et al. | 343—766 XR |
| 2,992,563 | 7/1961 | Lassen | 74—675 |

ROY D. FRAZIER, *Primary Examiner.*

R. P. SEITTER, *Assistant Examiner.*